United States Patent [19]

Mortenson

[11] Patent Number: 5,042,827
[45] Date of Patent: Aug. 27, 1991

[54] AUTOMATICALLY SHIFTING STAIR CLIMBER STRUCTURE FOR A REPOSITIONABLE HAND TRUCK

[75] Inventor: Carl N. Mortenson, Midland, Mich.

[73] Assignee: Magline Inc., Pinconning, Mich.

[21] Appl. No.: 431,774

[22] Filed: Nov. 6, 1989

[51] Int. Cl.[5] .............................................. B62B 5/02
[52] U.S. Cl. ................................. 280/5.22; 280/43.1; 280/47.21; 180/8.7
[58] Field of Search ...................... 280/5.22, 5.24, 5.2, 280/5.24, 5.32, 47.21, 43.1; 180/8.7

[56] References Cited

U.S. PATENT DOCUMENTS

| | | | |
|---|---|---|---|
| 2,132,069 | 10/1938 | Hall | 280/5.22 |
| 2,715,533 | 8/1955 | Strausburg | 280/5.22 |
| 3,997,182 | 12/1976 | Mortenson | 280/5.24 |
| 4,130,291 | 12/1978 | Saethre et al. | 280/5.22 |
| 4,762,333 | 8/1988 | Mortenson | 280/47.21 |

FOREIGN PATENT DOCUMENTS

| | | | |
|---|---|---|---|
| 0056490 | 7/1982 | European Pat. Off. | 280/5.22 |
| 0808411 | 7/1951 | Fed. Rep. of Germany | 280/5.22 |
| 2111001 | 6/1983 | United Kingdom | 280/5.22 |

*Primary Examiner*—Charles A. Marmor
*Assistant Examiner*—Anne Marie Boehler
*Attorney, Agent, or Firm*—Learman & McCulloch

[57] ABSTRACT

A two-wheeled hand truck has a vertically inclined upright frame with a load supporting nose at its lower end. The frame is supported on a pair of wheels mounted on an axle by brackets which are pivotally connected to the frame for movement from a first load supporting position adjacent the frame to a rearward second position for supporting higher center of gravity loads. A stair climber structure is pivotal on the axle, and a link structure automatically shifts the position of the rear inclined linear surfaces of the stair climber structure to maintain them in a plane extending tangentially to the peripheries of the wheels when the brackets and wheels are moved.

11 Claims, 4 Drawing Sheets

FIG.1

AUTOMATICALLY SHIFTING STAIR CLIMBER STRUCTURE FOR A REPOSITIONABLE HAND TRUCK

BACKGROUND OF THE INVENTION

This invention relates to certain new and useful improvements in two-wheeled hand trucks or dollies of the type wherein a primary frame mounted on a pair of wheels is adapted in use to assume a generally vertical position, and has a generally forwardly disposed nose adapted to transport loads which are of such bulk and weight that it is not practical to attempt to carry them without assistance. More particularly, the invention relates to hand trucks of the type disclosed in U.S. Pat. No. 4,762,333 entitled "Repositionable Hand Truck", wherein wheel-supporting brackets are pivotally connected to the frame in a manner to permit movement of the wheels from a first load supporting position, in which the wheels are adjacent to the lower end of the frame, to a second load supporting position in which the wheels and axle are moved materially rearwardly for supporting loads with a relatively higher center of gravity.

In this patent, available energy storing and pressure exerting mechanism, in the form of gas cylinders, operate through moment arms on opposite sides of the bracket pivots to releaseably retain the wheel structure in each of its positions. While fixed-position stair climbers have been employed on more conventional hand trucks in a position in which their linear rear surfaces are in lateral alignment with the rear peripheral surfaces of the wheels of the hand truck, no one has, to my knowledge, developed a stair climber structure for hand trucks of the type disclosed in the patent which automatically is shifted to such a position of alignment when the load supporting position of the wheels is shifted to suit the particular load to be carried in the manner disclosed in the aforesaid patent.

In the present assignee's U.S. Pat. No. 3,997,182, the stair climber members employed have selectable alternate openings enabling attachment to the fixed brackets of the hand truck at a differing location when it is desired to change the wheels on the hand truck to wheels of differing size. Such stair climber rails need to be uncoupled, and then recoupled, using the alternate set of openings, a clip securing the upper ends of the stair climbers to the side rails also needs to be unfastened so that the stair climbers can be slid upwardly or downwardly with respect to the side rails of the hand truck, to the extent desired. None of this occurs automatically, and could not, because the brackets and axle are fixed. Moreover, such selectable openings cannot be used with the hand truck disclosed in U.S. Pat. No. 4,762,333.

SUMMARY OF THE INVENTION

The hand truck of the present invention includes a primary frame, with a forwardly projecting nose part at its lower end, and a handle at its upper end, which can be grasped by the user to propel the truck. The pair of wheels for supporting the primary frame are mounted on axle carrying brackets which are pivotally connected to the frame for movement from a first load supporting position to a rearward second load supporting position. Yieldable pressure exerting members, disclosed in the form of gas cylinders, connect between the brackets and frame to provide an overcomeable locking resistance exerted through a first moment arm lying on one side of the pivot. Upon pivoting movement of the brackets in a direction to swing the brackets to the second position, an overcomeable locking resistance to return movement of the brackets is exerted through a second moment arm lying on the other side of the pivot. Stair climber structure, having downwardly and forwardly inclined rear surface portions, extending generally linearly for engaging the front edges of the multiple steps of stairs, is pivotally connected to the axle and to the primary frame. Link structure automatically shifts the stair climber structure to position the rear surface portions in lateral planes which extend tangentially to the peripheries of the wheels when the wheels and axle are moved from the first loading position to the second loading position, and back again.

One of the prime objects of the present invention is to provide a stair climber structure for a more versatile hand truck having such a manipulatable wheel structure, which automatically shifts to the desired operative position.

Still another object of the invention is to provide automatically shifting stair climbers which assist in reducing the stress on the back of the hand truck user.

Still another object of the invention is to provide a hand truck of the character described with durable and reliable stair climbers of minimum weight and of inexpensive nature, which, in adjusting to proper position automatically, insure optimum operation of the hand truck when stairs are to be negotiated.

Still another object of the invention is to provide stair climbers which are pivotally carried on the axle of the vehicle and are positioned by a reactive mutual link which is pivotally connected between the stair climber structure and the frame.

Still another object of the invention is to provide a heavy duty hand truck of the character described which is rugged in character, and yet does not depend upon mechanical latches or similar devices which need to be manipulated by the user in repositioning the stair climber structure to correlate with the repositionable wheel structure in either of its positions.

Other objects and advantages of the invention will become apparent by reference to the following specification and to the drawings.

IN THE DRAWINGS

Figure 1:
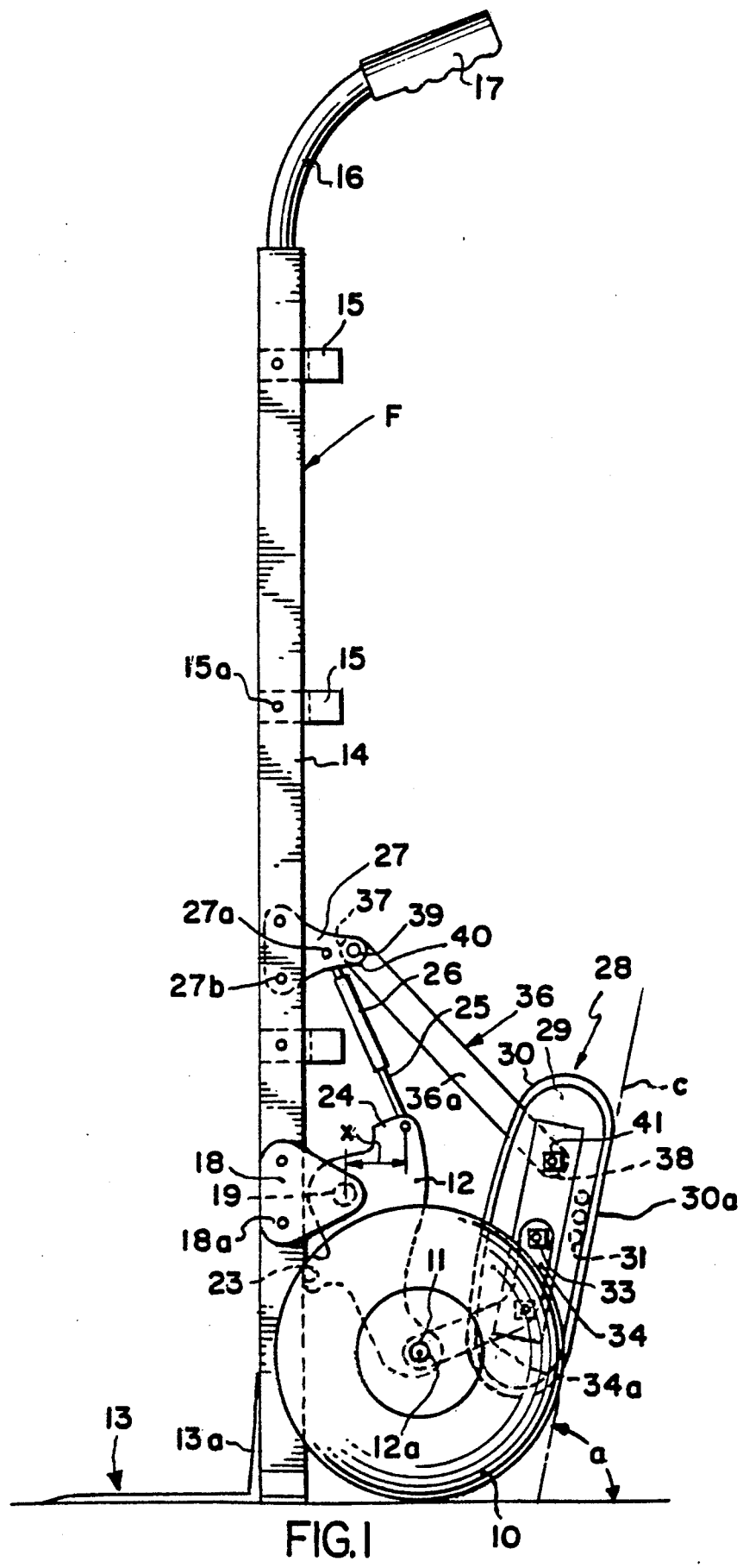
FIG. 1 is a side elevational view of my improved hand truck shown in a loading position, the wheel structure being positioned to facilitate the carrying of loads having a relatively lower center of gravity.
Figure 2:
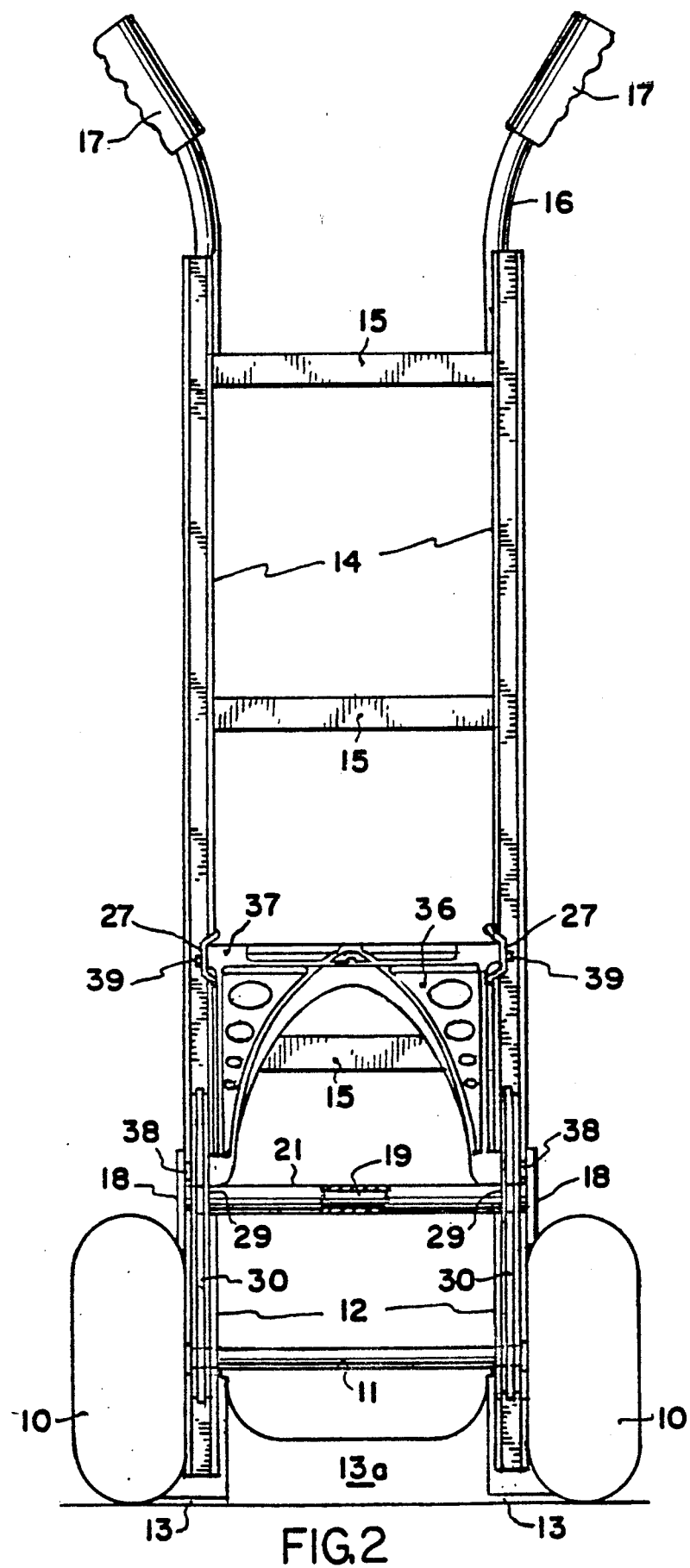
FIG. 2 is a rear elevational view thereof.
Figure 3:
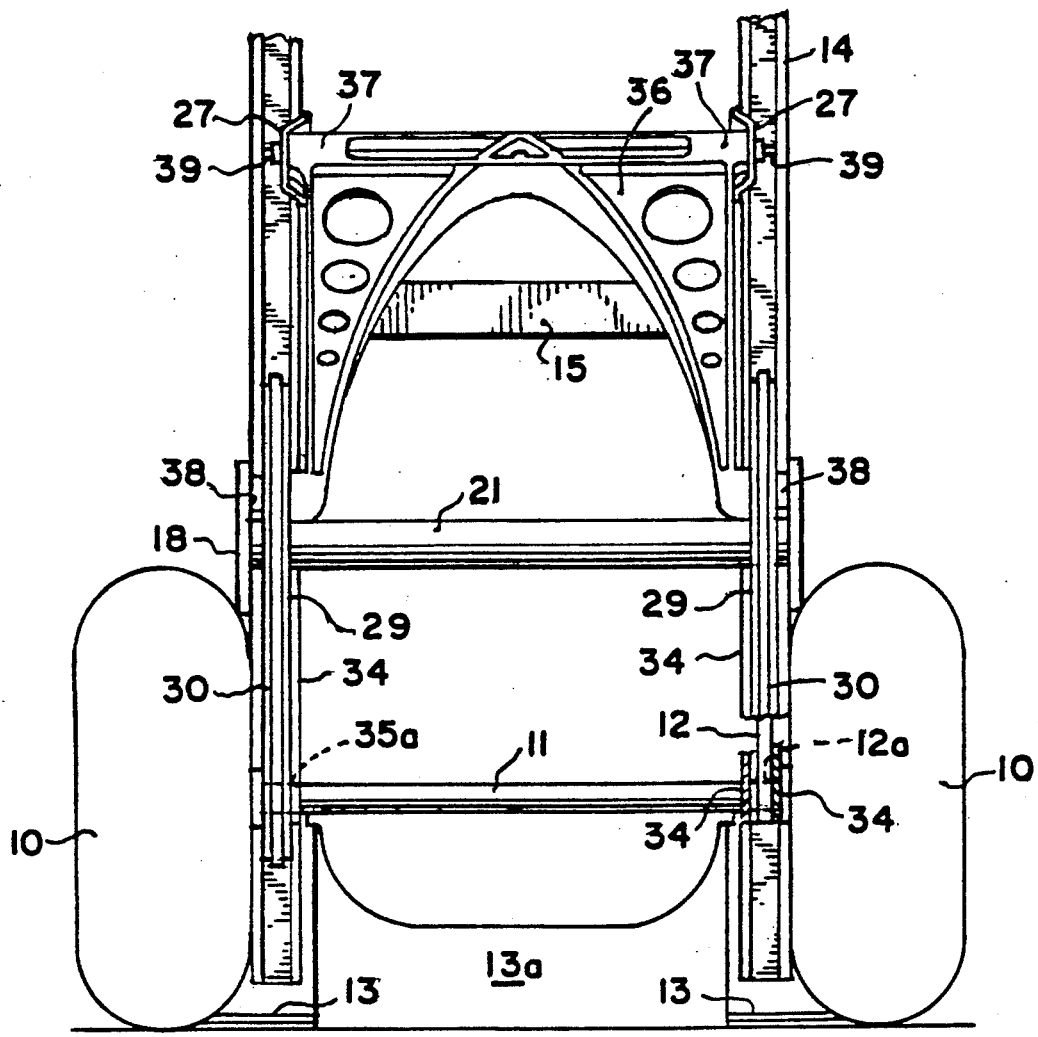
FIG. 3 is a fragmentary rear elevational view on an enlarged scale.
Figure 5:
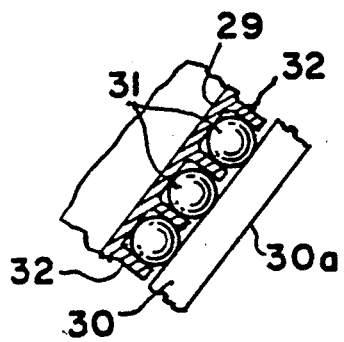
FIG. 5 is an enlarged, fragmentary sectional, side elevational view better illustrating the rollers used inboard of the stair climber belts.
Figure 6:
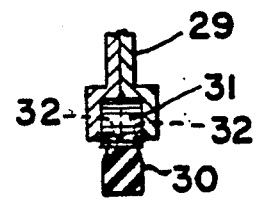
FIG. 6 is an enlarged fragmentary transverse sectional view taken on the line 6—6 of FIG. 4.

Referring now more particularly to the accompanying drawings, the hand truck illustrated is shown as comprising preferably rubber-tired wheels 10, rotatably mounted on a dead axle 11. Side brackets, generally designated 12, have openings 12a for passing the dead axle 11 and extend forwardly from the axle 11 toward a generally rectangular, open primary frame, generally designated F. An angular load supporting nose member 13 having a back part 13a is affixed to frame said rails 14 in the manner described, for instance, in U.S. Pat. No. 3,997,182.

The frame F is disclosed as having parallel vertical side rails 14, which may be formed of extruded aluminum in a predetermined configuration, and curvilinear braces 15 of the character described in U.S. Pat. No. 4,563,014 span, and may be fixed to, the side rails in the manner disclosed in that patent, as with screw members 15a. At their upper ends, side rails 14, which typically are of channel configuration, and are open along their inner sides, receive handle stems 16. The stems 16 project rearwardly and are provided with handle grips 17, which enable the user to securely grasp the hand truck and maintain it in a vertically inclined, load transporting position.

Figure 4:
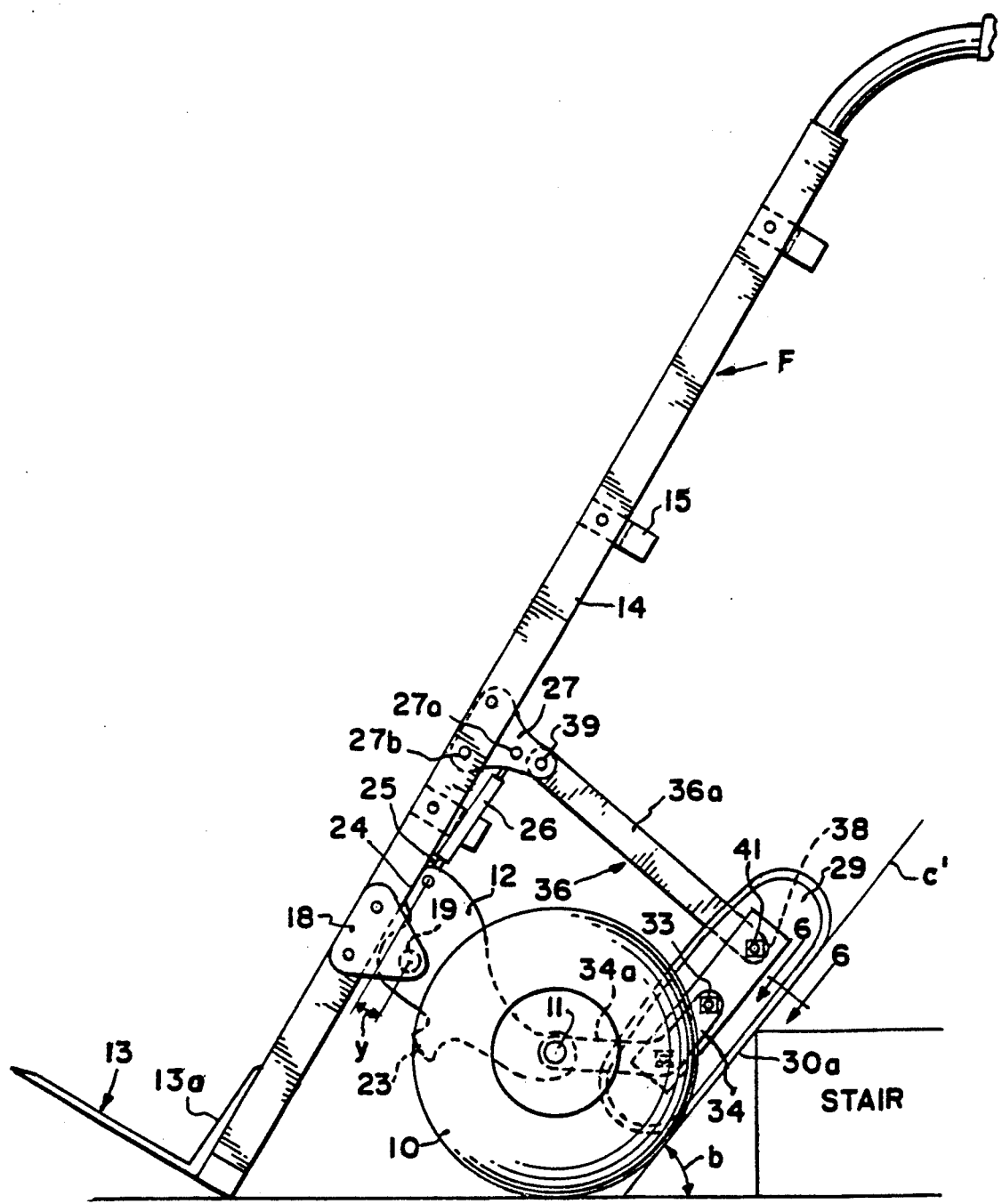
FIG. 4 is a side elevational view, similar to FIG. 1, except that the hand truck has been tilted to a transport position, and the wheel structure has been repositioned to facilitate the transfer of loads having a relatively higher center of gravity.

Mount plates 18, which may be secured in position on rails 14 by screws 18a, vertically above the axle 11, carry a fixed shaft 19. Provided in each bracket 12, is an opening for receiving a tubular sleeve 21 which is received on the shaft 19 and can pivot with respect to it. The brackets 12 are welded, or otherwise suitably affixed, to the ends of sleeve 21. Each bracket 12 is provided with both a first rail-engaging pad 23 and an alternate, upper, rail-engaging pad 24, which function as both bearing surfaces and stop surfaces to define the two different positions of the wheels 10 shown in FIGS. 1 and 4 respectively. In FIG. 1, it is the pads 23 which are in engagement with the rear wall of each side rail 14. In FIG. 4, it is the upper pads 24 which are in engagement with the rear faces of side rails 14.

As observed in U.S. Pat. No. 4,762,333, which is incorporated herein by reference, for any purpose which may be necessary, the pads 23 and 24 are disposed on opposite sides of the pivot shaft 19 and are angularly displaced in the range of 60° to 75° apart. Pivotally connected to each of the brackets 12, at or adjacent its pads 24, is the piston rod 25 of a conventional gas cylinder 26, which is pivotally connected at 27a to each frame side rail 14 via mount plates 27. It is to be understood that gaseous pressure within each of the cylinders 26 exerts a constant pressure on the pistons integrated with the piston rods 25, and yieldably resists any compression of the piston rods 25 into the cylinders or casings 26. Typically cylinders 26 may contain a gas under a pressure of 70 psi.

When the brackets 12 move from the FIG. 1 position to the FIG. 4 position, the cylinders 26 typically are pivoted through an arc of about 30°. In the FIG. 1 position, the gas cylinders 26 resist the compression of piston rods 25 and accordingly movement of the upper ends of brackets 12 forwardly toward the frame F about pivot shaft 19. This resistance force is applied through a moment arm x which extends rearwardly from pivot shaft 19. In the FIG. 4 position, the pivot pins 25a on brackets 12 are displaced forwardly, and thus the resistance to compression of each piston rod 25 is applied through a moment arm y to releasably maintain the brackets 12 in the FIG. 4 position.

THE STAIR CLIMBER STRUCTURE

Mounted in position on the hand truck to extend linearly at a downwardly and forwardly inclined angle a in FIG. 1, and b in FIG. 4, are stair climber members generally designated 28. Each member 28 comprises a frame 29, around which an endless belt 30 of suitable composition is trained. Preferably the belts 30 will be hard wearing, rubberized fabric belts, having rear surfaces 30a extending linearly in a plane c in FIG. 1 which is tangential to the peripheral surfaces of the wheels 10. In FIG. 4 surfaces 30a are disposed in a different plane c', which still is tangentially disposed with respect to the peripheries of the wheels 10.

As FIG. 1 indicates, the belts 30 travel in engagement with rollers 31 trapped in cage plates 32 formed on the frame members 29 along the rear walls thereof. Typically the cylindrical rollers 31, which freely revolve, are formed of nylon, or some other hard wearing, yet rugged, plastic material.

Affixed to the frame 29 of each member 28 by bolts 33 are a pair of straddling links 34, having relatively short clevis legs 34a with openings 35a for receiving the axle 11. Legs 34a extend on each side of the bracket 12 and are rotatably received by the dead axle 11. The upper ends of each frame member 29 are pivotally connected to the mounts 27 fixed on frame F by a common U-shaped link structure generally designated 36 and having upper bearings 37 for receiving a pivot shaft 39 which extends through openings 40 in the mount plates 27 rearwardly of the pivots 27a. The downwardly extending legs 36a of link structure 36 have bearings 38 for receiving the pivot pins 41 which pivotally secure them to the upper ends of frame members 29.

THE OPERATION

As disclosed in U.S. Pat. No. 4,762,333, the objective is to maintain the hand truck in a virtually balanced condition for easiest transport of the load. Assuming, for example, that it is desired to move the axle 11 and wheels 10 from the FIG. 1 to the FIG. 4 position, once some of the load is placed on the nose member 13, the operator can place his foot on the sleeve 21 and press it forwardly. This pressure will cause the brackets 12 to pivot about the shaft 19 as the pressure exerted by the foot forces the piston rods 25 to compress inwardly. Once the brackets 12 swing beyond "center", (i.e., beyond the shaft 19) cylinders 26 assist the brackets 12 to complete their pivoting swing to a position in which pads 24 prevent further forward movement. The initial locking resistance applied through the moment arm x is overcome in this way. As the axle 11 moves rearwardly, the lower ends of the frame members 29 are also moved rearwardly, the upper ends of the members 29 are caused to swing rearwardly about the axle 11 by the rigid link 36 which pivots at 37 and 38 to cause the surfaces 30a to assume a more inclined angle c', still lying in a plane (although not the same plane), which is tangential to the peripheries of wheels 10. In the FIG. 4 position of the axle 11 and wheels 10, any return pivoting movement of the brackets 12 would need to compress rods 25 and this resistance to compression is exerted through the lever arm y. The gas cylinders 26 not only operate to maintain the wheels 10 in releasably locked position, they also maintain the position of the stair climber members 29 in each position of the wheels 10.

With the present hand truck, a curb, or single stair, is easily negotiated without the need to apply any substantial load pulling force. By pivoting the hand truck to a more horizontal position about the positions of engagement of the downwardly and forwardly inclined belts with the upper edge of the curb, the belts travel to permit the operator to ease the wheels to a position engaging the top of the curb.

While the embodiment of the invention has been described in detail, it should be apparent to those skilled in the art that the disclosed embodiment may be modified within the scope of the invention. Therefore, the foregoing description in all aspects is to be considered exemplary, rather than limiting in any way, and the true scope of the invention is that defined in the following claims.

What is claimed is:

1. A two-wheeled hand truck having an elongated upright frame which in use travels in a vertically inclined position, and which includes:
   a. a load-supporting, forwardly extending nose fixed to the frame at its lower end;
   b. a pair of laterally spaced apart, wheel support brackets connected to the lower end of the frame above the nose to project rearwardly;
   c. an axle connecting the brackets;
   d. a pair of wheels rotatably mounted on the axle;
   e. pivot means pivotally connecting the brackets to the frame for movement from a first load supporting position in which the wheels are adjacent the lower end of the frame for supporting relatively low-center-of-gravity loads to a second position in which the wheels are moved rearwardly to support loads with relatively a higher center of gravity;
   f. means retaining said wheels and axle in a selected one of said first and second positions;
   g. a stair climber structure, having a downwardly inclined rear surface for engaging the front edges of the steps of stairs, pivotally connected to said axle; and
   h. link means, pivotally connecting said stair climber structure with said frame and axle automatically reactive with said frame to shaft the position of said rear surface to a position lying substantially in a lateral plane extending tangentially to the peripheries of said wheels when the wheels and axle are moved from said first position to said second position, and back again.

2. The hand truck defined in claim 1 wherein said stair climber structure comprises a pair of laterally spaced, stair climber frames having endless belts trained therearound and presenting a pair of linear rear surfaces, said stair climber frames providing a trackway with entrapped exposed rollers on their rear walls adjacent said belts.

3. The hand truck defined in claim 1 wherein said link means pivotally connecting said stair climber structure to said axle and frame comprises a first link fixed to said stair climber structure and having an opening freely passing said axle so as to be pivotal thereon, and second link, of materially longer predetermined length, pivotally secured at each end to said stair climber structure and frame respectively.

4. The hand truck defined in claim 3 wherein said second link is of the same fixed length in both said positions of said wheels.

5. The hand truck defined in claim 3 in which said frame between the connection of the wheel support brackets thereto and the connection of the second link thereto, said wheel support brackets, said stair climber structure, and said second link, in side elevation provides a four sided configuration with hinged corners in which the length of each side remains the same in both said positions of said wheels.

6. The hand truck defined in claim 1 wherein yieldable pressure exerting means connects between said brackets and frame at a spaced vertical distance from the connections of said brackets to said frame, and at a spaced distance rearward of said pivot means when the brackets are in said first position, to provide an overcomeable, locking resistance exerted through a first moment arm lying on one side of said pivot means to pivoting movement of said brackets and stair climber structure in a direction to swing said brackets to said second position, and to provide an overcomeable locking resistance to return movement of said brackets and stair climber structure exerted through a second moment arm lying on the other side of said pivot means.

7. The hand truck defined in claim 6 wherein said stair climber structure comprises a pair of laterally spaced apart stair climbers, and said link means pivotally connecting said stair climber structure to said axle and frame includes a first link fixed to each stair climber and having an opening freely passing said axle so as to be pivotal thereon, and a second link of materially longer predetermined length relative to said first links pivotally secured to each stair climber, and pivotally secured to said frame rearward of the connection of said yieldable pressure exerting means to said frame.

8. The hand truck defined in claim 7 wherein said hand truck frame includes a pair of laterally spaced upright rails with graspable handle means at their upper ends and a fixed mount projects rearwardly from each of said rails; said yieldable pressure exerting means comprises a gas cylinder; and first pivot pins connect the gas cylinder to each mount and thereby to said frame; said second link has bearings at its upper end, and second pivot means extend through said mounts rearwardly of said first pivot pins into said bearings for pivotally mounting the upper end of said second link; the said second pivot means being substantially in vertical alignment with said pivot means connecting the brackets to the frame when said brackets are in said first position.

9. The hand trunk defined in claim 1 wherein said rear surfaces of the stair climbers extend downwardly and forwardly.

10. In a method of automatically shifting the stair climber structure of a two-wheeled hand truck incorporating an elongate vertically inclined upright frame having a load supporting, forwardly projecting nose at its lower end, a pair of wheel brackets connecting to the lower end of the frame above the nose and projecting rearwardly; an axle co.\necting the brackets; a pair of wheels rotatably mounted on the axle; pivot means pivotally connecting the brackets to the frame for movement from a first load supporting position in which the wheels are adjacent tot he lower end of the frame for supporting loads with a relatively lower center of gravity to a second load supporting position in which the wheels and axle are moved materially rearwardly for supporting loads with a relatively higher center of gravity; vertically inclined stair climber structure pivotal on said axle; link structure pivotally connecting the stair climber structure with the frame: and means for releasably retaining said wheels and axle in a selected one of said first and second positions, the steps of:
   a. disabling said retaining means and applying pivoting pressure causing said brackets to move said axle and wheels from one of said load supporting positions toward the other of said load supporting positions; and b. by applying said pivoting pressure moving said axle and wheel to automatically pivot the lower end of said stair climber structure about said axle, while reacting said link structure with said frame to pivot the upper end of said stair climber structure to cause said stair climber structure to automatically position the rear linear surface of said stair climber structure in a lateral plane which is substantially tangent to the peripheries of said wheels when the wheels and axle are moved from said one of said positions to the other of said positions, and back again.

11. A two-wheeled hand truck having an elongated upright frame which in use travels in a vertically incline position, and which includes:

a. a load supporting, forwardly extending nose fixed to the frame at its lower end;

b. a pair of laterally spaced apart, axle and wheel support bracket assemblies connected to the lower end of the frame above the nose to project rearwardly;

* * * * *

UNITED STATES PATENT AND TRADEMARK OFFICE
CERTIFICATE OF CORRECTION

PATENT NO. : 5,042,827
DATED : August 27, 1991
INVENTOR(S) : Carl N. Mortenson It is certified that error appears in the above-identified patent and that said Letters Patent is hereby corrected as shown below:

Column 5, line 39, change "shaft" to -- shift --; line 56, after "and" insert -- a --.

Column 6, line 49, after "wheel" insert -- support --; line 55, change "tot he" to -- to the --.

Column 8, Claim 11, after paragraph b. add the following:

-- c. said assemblies including an axis;

d. a pair of wheels rotatably mounted on the axle;

e. pivot means pivotally connecting said assemblies to the frame for movement from a first load supporting position in which the wheels are adjacent the lower end of the frame for supporting relatively low-center-of-gravity loads to a second position in which the wheels are moved rearwardly to support loads with relatively a higher center of gravity;

f. means retaining said wheels and axle in a selected one of said first and second positions;

g. a stair climber structure, having a downwardly inclined rear surface for engaging the front edges of the steps of stairs,

UNITED STATES PATENT AND TRADEMARK OFFICE
CERTIFICATE OF CORRECTION

PATENT NO. : 5,042,827
DATED : August 27, 1991
INVENTOR(S) : Carl N. Mortenson

It is certified that error appears in the above-identified patent and that said Letters Patent is hereby corrected as shown below:

pivotally connected to said assemblies; and h. link means, pivotally connecting said stair climber structure with said frame, reacting with said frame to automatically shift the position of said rear surface to a position lying substantially in a lateral plane extending tangentially to the peripheries of said wheels when the wheels and axle are moved from said first position to said second position, and back again.

Signed and Sealed this

Twenty-second Day of December, 1992

Attest:

DOUGLAS B. COMER

*Attesting Officer*     *Acting Commissioner of Patents and Trademarks*